(12) United States Patent
Pleet et al.

(10) Patent No.: US 11,117,627 B2
(45) Date of Patent: Sep. 14, 2021

(54) OVERMOLDED VEHICLE SHEET METAL STRUCTURES WITH INTEGRATED ATTACHMENTS

(71) Applicant: FORD GLOBAL TECHNOLOGIES, LLC, Dearborn, MI (US)

(72) Inventors: Edward Andrew Pleet, Novi, MI (US); Jason Scott Balzer, Commerce Township, MI (US); Todd John Mueller, Canton, MI (US); Rohit Telukunta, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 16/702,677

(22) Filed: Dec. 4, 2019

(65) Prior Publication Data
US 2021/0171103 A1 Jun. 10, 2021

(51) Int. Cl.
| | |
|---|---|
| *B62D 29/00* | (2006.01) |
| *B62D 25/04* | (2006.01) |
| *B62D 27/06* | (2006.01) |
| B62D 21/09 | (2006.01) |
| B29L 31/30 | (2006.01) |
| B60R 19/18 | (2006.01) |

(52) U.S. Cl.
CPC ........... *B62D 29/004* (2013.01); *B62D 25/04* (2013.01); *B62D 27/065* (2013.01); B29L 2031/3002 (2013.01); B60R 2019/1866 (2013.01); B62D 21/09 (2013.01); B62D 29/005 (2013.01)

(58) Field of Classification Search
CPC ....................... B62D 29/004; B29L 2031/3002
USPC ............. 296/193.09, 193.1, 203.02, 193.06, 296/187.05, 1.07–1.08, 39.1
See application file for complete search history.

(56) References Cited

U.S. PATENT DOCUMENTS

| | | | | |
|---|---|---|---|---|
| 4,220,681 | A * | 9/1980 | Narita | ..................... B60R 13/04 |
| | | | | 293/126 |
| 6,416,095 | B1 * | 7/2002 | Keys | ....................... B60R 13/04 |
| | | | | 293/126 |
| 7,478,478 | B2 * | 1/2009 | Lutz | ..................... B62D 29/002 |
| | | | | 29/458 |
| 8,047,603 | B2 | 11/2011 | Goral et al. | |
| 9,771,109 | B2 | 9/2017 | Nagwanshi et al. | |

(Continued)

FOREIGN PATENT DOCUMENTS

EP    1 369 308 B1    9/2006

OTHER PUBLICATIONS

Dinesh, et al., Light Metal-Plastic Body-in-White Solutions for Automotive, SABIC, Paper No. 17-0126, 17 pages.

*Primary Examiner* — Dennis H Pedder
(74) *Attorney, Agent, or Firm* — David Coppiellie; Carlson, Gaskey & Olds

(57) ABSTRACT

This disclosure details overmolded vehicle sheet metal structures that included integrated attachments for achieving part integration. An exemplary sheet metal structure includes a sheet metal panel, a reinforcing structure molded on the sheet metal panel, and an integrally molded attachment structure formed within the reinforcing structure. In some embodiments, the integrally molded attachment structure may include a nut, a bracket, or both. An additional vehicle component may be attached to the sheet metal panel via the integrally molded attachment structure. The sheet metal structure may be formed in a single shot injection molding process.

20 Claims, 8 Drawing Sheets

(56) References Cited

U.S. PATENT DOCUMENTS

| | | | |
|---|---|---|---|
| 2004/0160088 A1* | 8/2004 | Staargaard | B62D 29/001 296/193.09 |
| 2015/0284035 A1* | 10/2015 | Reese | B29C 45/14598 296/193.02 |
| 2019/0144044 A1* | 5/2019 | Meskin | B62D 27/00 296/187.09 |
| 2019/0210662 A1 | 7/2019 | Eck et al. | |

* cited by examiner

OVERMOLDED VEHICLE SHEET METAL STRUCTURES WITH INTEGRATED ATTACHMENTS

TECHNICAL FIELD

This disclosure relates to reinforced vehicle body structures, and more particularly to overmolded vehicle sheet metal structures that included integrated attachments for achieving part integration.

BACKGROUND

Vehicle body-in-white (BIW) members are traditionally constructed from stamped and welded sheet metal panels. The BIW members are configured to absorb a significant amount of impact energy during impact events. It may be desirable to mount additional vehicle components directly to the BIW members.

SUMMARY

A vehicle body component according to an exemplary aspect of the present disclosure includes, among other things, a sheet metal panel, a reinforcing structure molded on the sheet metal panel, and an integrally molded attachment structure formed within the reinforcing structure.

In a further non-limiting embodiment of the foregoing vehicle body component, the vehicle body component is a vehicle pillar.

In a further non-limiting embodiment of either of the foregoing vehicle body components, the reinforcing structure includes a thermoplastic material.

In a further non-limiting embodiment of any of the foregoing vehicle body components, the reinforcing structure is molded on both an inboard side and an outboard side of the sheet metal panel.

In a further non-limiting embodiment of any of the foregoing vehicle body components, a rib structure of the reinforcing structure is molded on the inboard side and an energy absorbing portion of the reinforcing structure is molded on the outboard side.

In a further non-limiting embodiment of any of the foregoing vehicle body components, the integrally molded attachment structure is a weld nut that includes an internal thread configured to receive a fastener.

In a further non-limiting embodiment of any of the foregoing vehicle body components, the integrally molded attachment structure is a bracket.

In a further non-limiting embodiment of any of the foregoing vehicle body components, the integrally molded attachment structure is formed within a rib structure of the reinforcing structure.

In a further non-limiting embodiment of any of the foregoing vehicle body components, the integrally molded attachment structure is formed within an energy absorbing portion of the reinforcing structure.

In a further non-limiting embodiment of any of the foregoing vehicle body components, a vehicle component is attached to the sheet metal panel via the integrally molded attachment structure.

In a further non-limiting embodiment of any of the foregoing vehicle body components, a fastener is passed through the vehicle component and into an internal thread of the integrally molded attachment structure.

In a further non-limiting embodiment of any of the foregoing vehicle body components, the integrally molded attachment structure includes a bracket and a nut.

In a further non-limiting embodiment of any of the foregoing vehicle body components, the reinforcing structure includes a rib structure that includes one or more of straight ribs, honeycombs, cellular ribs, and/or bionic ribs.

A method according to another exemplary aspect of the present disclosure includes, among other things, overmolding a sheet metal panel with a reinforcing structure to form a vehicle body-in-white member. The reinforcing structure includes a rib structure and an integrally molded attachment structure formed in the rib structure.

In a further non-limiting embodiment of the foregoing method, overmolding the sheet metal panel with the reinforcing structure includes forming the rib structure of the reinforcing structure on a first side of the sheet metal panel and forming an energy absorbing structure of the reinforcing structure on a second side of the sheet metal panel.

In a further non-limiting embodiment of either of the foregoing methods, the first side is an inboard side and the second side is an outboard side.

In a further non-limiting embodiment of any of the foregoing vehicle body components, the method is a single-shot injection molding process.

In a further non-limiting embodiment of any of the foregoing vehicle body components, the attachment structure includes at least one of a nut and a bracket.

In a further non-limiting embodiment of any of the foregoing vehicle body components, the rib structure includes one or more of straight ribs, honeycombs, cellular ribs, and/or bionic ribs.

In a further non-limiting embodiment of any of the foregoing vehicle body components, the vehicle body-in-white member is part of a vehicle pillar.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details overmolded vehicle sheet metal structures that included integrated attachments for achieving part integration. An exemplary sheet metal structure includes a sheet metal panel, a reinforcing structure molded on the sheet metal panel, and an integrally molded attachment structure formed within the reinforcing structure. In some embodiments, the integrally molded attachment structure may include a nut, a bracket, or both. An additional vehicle component may be attached to the sheet metal panel via the integrally molded attachment structure. The sheet metal structure may be formed in a single shot injection molding process. These and other features of this disclosure are described in greater detail below.

Figure 1:
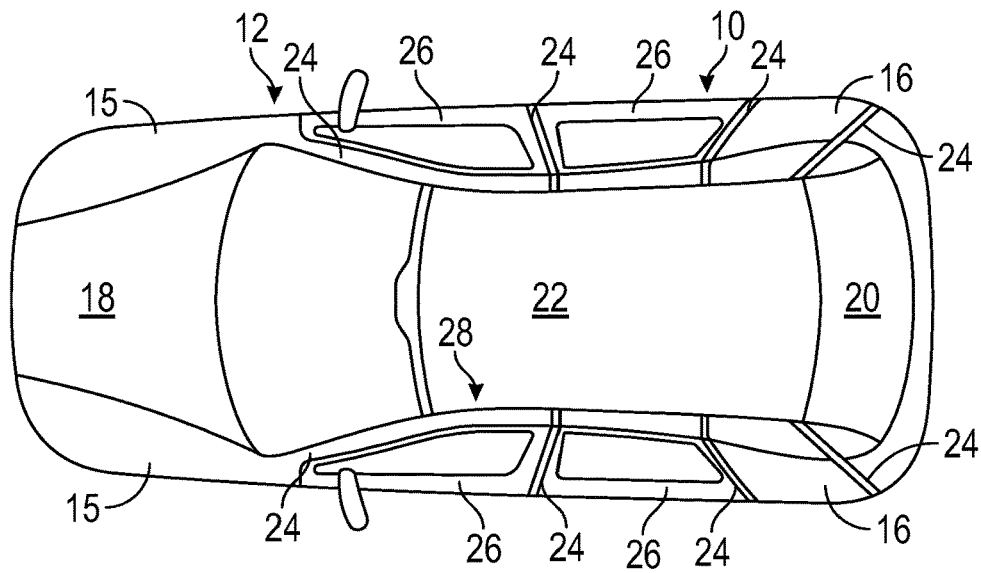
FIG. 1 is a top view of a vehicle.

FIG. 1 schematically illustrates a vehicle 10. The vehicle 10 could be a car, a truck, a van, a sport utility vehicle, or any other vehicle type. In an embodiment, the vehicle 10 is a conventional, internal combustion engine powered vehicle. In another embodiment, the vehicle 10 is a high voltage traction battery powered electric vehicle (e.g., battery electric vehicle (BEV), hybrid electric vehicle (HEV), plug-in hybrid electric vehicle (PHEV), etc.). In yet another embodiment, the vehicle 10 is an autonomous vehicle in which the motive functions of the vehicle 10 are controlled without direct input from a human driver.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a vehicle body 12 made up of a plurality of vehicle body structures. Among other vehicle body structures, the vehicle body 12 may include front side panels 15, rear side panels 16, a hood 18, a trunk lid/lift gate 20, an upper panel 22, two or more pillars 24 (e.g., A-pillar, B-pillar, C-pillar, D-pillar, etc.), and two or more doors 26. The vehicle body 12 may embody a unibody construction in which the vehicle body 12 and a vehicle chassis (not shown) are integrated with one another or may be part of a body-on-frame construction in which the vehicle body 12 is separate from the vehicle chassis.

Numerous vehicle body structures making up the vehicle body 12, including but not limited to the pillars 24, may be constructed from one or more body-in-white (BIW) members. The BIW members are traditionally made of high strength metallic materials. It is desirable to configure the BIW members to both absorb impact energy during vehicle impact events and to provide a mounting surface for mounting additional vehicle components relative to the vehicle 10. This disclosure therefore proposes vehicle BIW members that are structurally reinforced by plastic reinforcing structures and that further include integrally molded attachment structures formed on the reinforcing structures.

Figure 2:
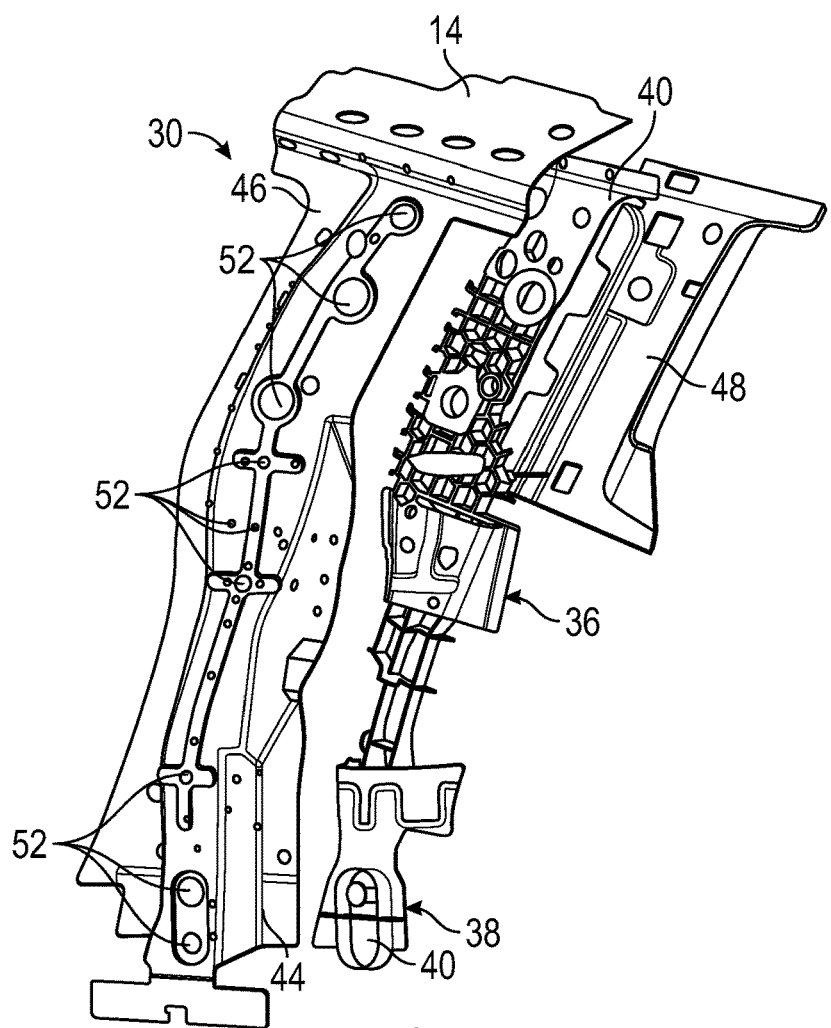
FIG. 2 is an exploded view of a body-in-white (BIW) member of a vehicle body structure (e.g., a vehicle pillar).
Figures 3, 4:
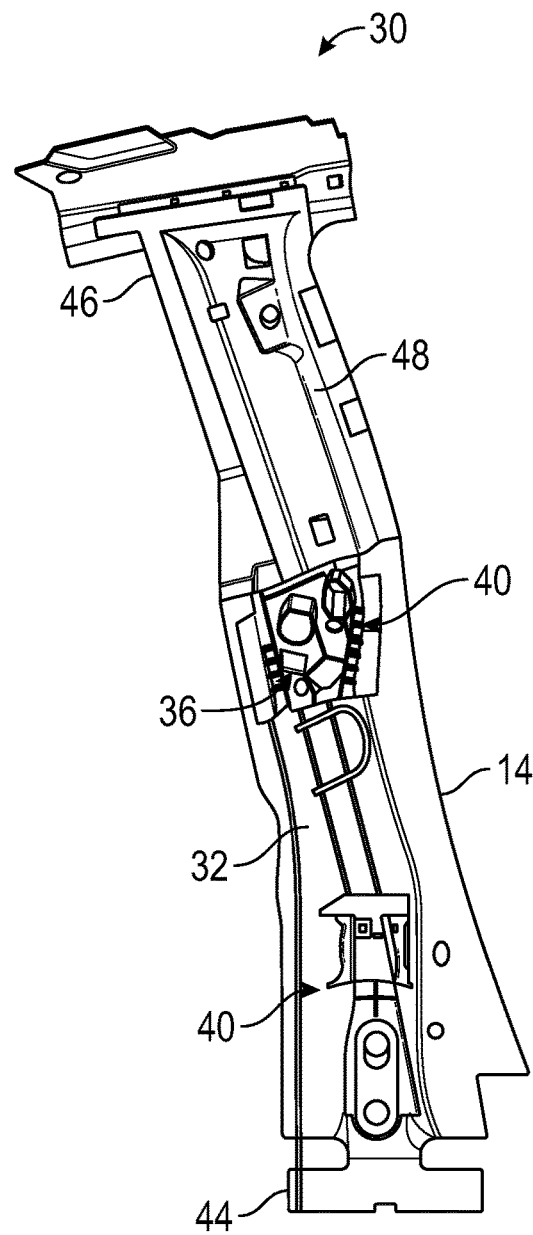
FIG. 3 is an inboard side of the BIW member of FIG. 2.
FIG. 4 is an outboard side of the BIW member of FIG. 2.

FIGS. 2-4 illustrate an exemplary BIW member 30 of a vehicle body structure (e.g., a pillar or other vehicle body structure). The BIW member 30 may include an outer panel 14 (e.g., a first sheet metal panel) having an inboard side 32 and an outboard side 34, a reinforcing structure 36, and an inner panel 48 (e.g., a second sheet metal panel). The reinforcing structure 36 may be molded on the inboard side 32 of the outer panel 14 and may include an energy absorbing portion 38 that is molded on the outboard side 34 of the outer panel 14. Thus, portions of the reinforcing structure 36 may be disposed on both the inboard side 32 and the outboard side 34 of the outer panel 14. The reinforcing structure 36 on the inboard side 32 provides local stiffening of the BIW member 30, and the energy absorbing portion 38 on the outboard side 34 may improve overall impact energy absorption of the BIW member 30 and may further reduce gaps relative to other vehicle body structures.

The reinforcing structure 36 may be made of a plastic or composite material and may be overmolded onto the outer panel 14. For example, the reinforcing structure 36 may include a plastic rib structure 40 (straight, honeycomb core, cellular, and/or bionic) that is overmolded onto the inboard 32 and outboard 34 sides of the sheet metal outer panel 14. The rib structure 40 provided on the outboard side 34 establishes an outboard surface 42 (see FIG. 4) for filling in open areas or gaps that may extend between the BIW member 30 and neighboring vehicle body structures (e.g., body side outer panels). This arrangement thereby provides for the improved ability to absorb impact loads and for better controlling energy transfer of the absorbed loads along a desired load path during the impact events.

The rib structures 40 act on the outboard side 34 as the first point of contact and are the primary structural components managing impact energy. Such an arrangement allows the metallic outer panel 14 to maintain its cross-sectional properties throughout the loading cycle, thus effectively transferring loads that could potentially buckle the sheet metal stamping. The energy absorbing portion 38 of the reinforcing structure 36 absorbs the loads within the outer panel 14 by averting or delaying the buckling of the base sheet metal, thus efficiently transferring the impact load upward toward a center of the outer panel 14 along a more desirable load path. Additionally, the combination of the reinforcing structure 36 and the energy absorbing portion 38 provides the required stiffness for the BIW member 30, which enables down grading and gauging of the base sheet metal stampings while maintaining the required performance levels.

The rib structure 40 of the energy absorbing portion 38 may be located near a bottom 44 of the outer panel 14 as best shown in FIG. 4. The rib structure 40 for the reinforcing structure 36 on the inboard side 32 may be primarily located near a top 46 of the outer panel 14. The inner panel 48 of the BIW member 30 may be disposed over top of this portion of the rib structure 40 on the inboard side 32 as shown in FIG. 3. In an exemplary embodiment, overmolding the composite or plastic material on both the outboard 34 and inboard 32 sides of the outer panel 14 may be performed in a single shot injection molding process, which results in weight reduction and allows for a down gauge, down grade, and material cost reduction. Additionally, the disclosed embodiments allow for a reduced part cost while still maintaining desired performance, noise-vibration-harshness (NVH), and stiffness requirements.

As best shown in FIGS. 3-4, mechanical interlocks 50 may be molded onto the outer panel 14. Holes 52 on the outer panel 14 (shown in FIG. 2) allow the plastic to flow on either side 32, 34, thereby creating one or more plastic bands 54 and mechanical interlocks 56 on the outboard side 34, which help to hold the rib structure 40 that is molded on the inboard side 32 in position. This enables both the structures, i.e., the metal outer panel 14 and the overmolded plastic reinforcing structure 36 and energy absorbing portion 38, to perform as one part. Further, overmolding on both the inboard 32 and outboard 34 sides is made in a single shot by utilizing the through holes 52, which avoids having to separately mold each side of the part.

Figure 5:
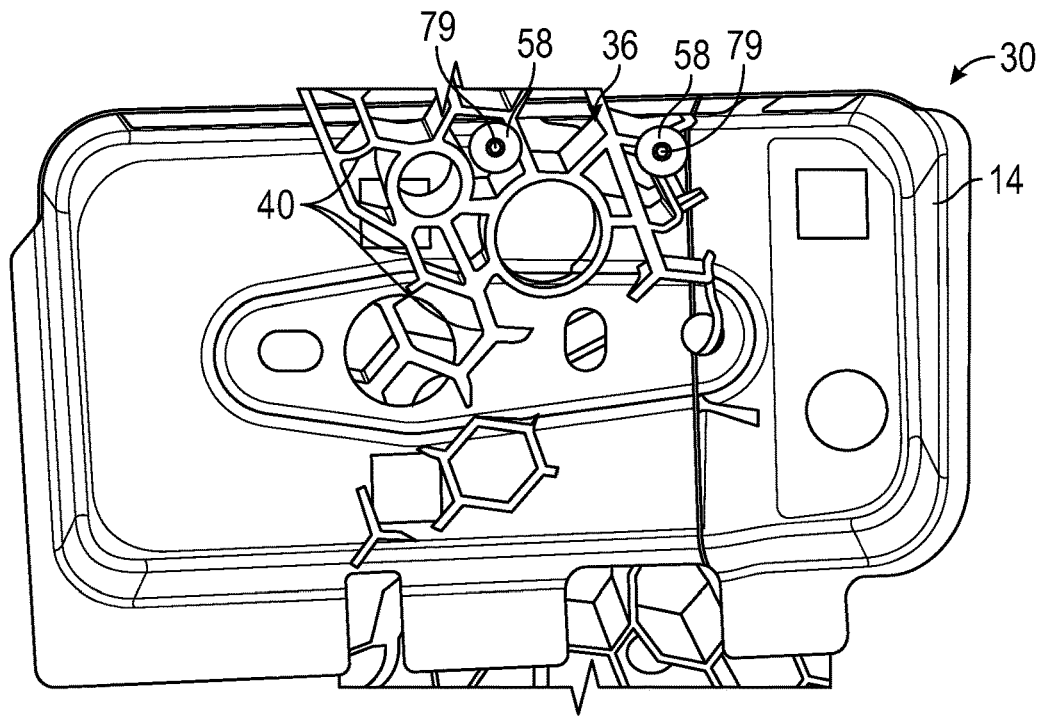
FIG. 5 illustrates integrally molded attachment structures of a BIW member.
Figure 6:
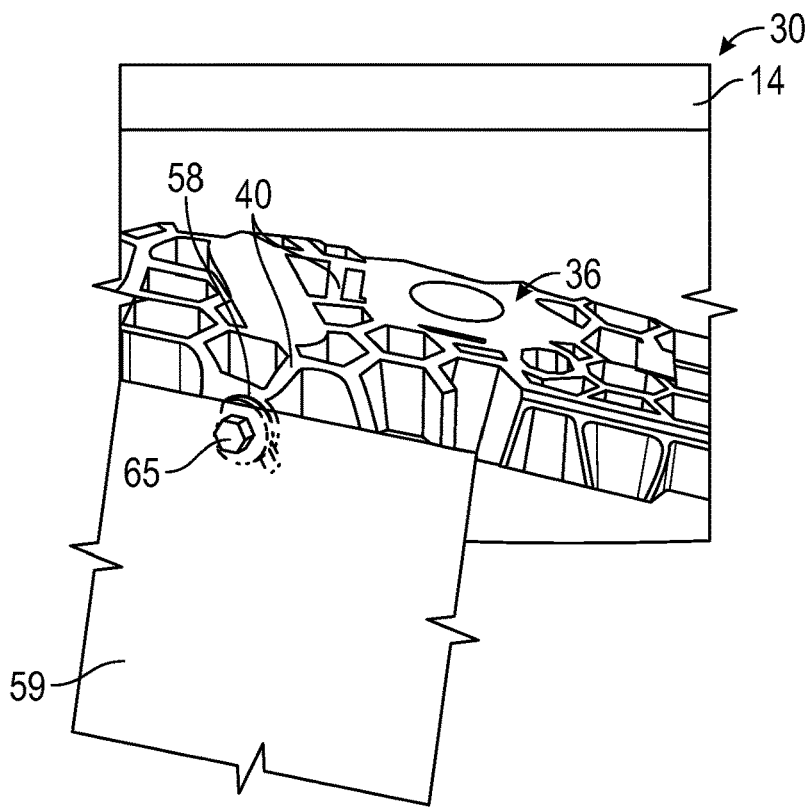
FIG. 6 illustrates a fastener received by one of the integrally molded attachment structure of FIG. 5.

Referring now to FIGS. 5-6, the BIW member 30 may additionally include one or more integrally molded attachment structures 58. The integrally molded attachment structures 58 may be molded into the reinforcing structure 36 of the BIW member 30. In an embodiment, the integrally molded attachment structures 58 are molded into the plastic rib structure 40 of the reinforcing structure 36. The integrally molded attachment structures 58 may include embossments, weld nuts, brackets, clips, mounts, reinforcements, etc., or any combination of these or similar structures. The integrally molded attachment structures 58 act as structural reinforcements for mounting additional vehicle components 59 to the BIW member 30.

In the embodiment illustrated in FIGS. 5-6, the integrally molded attachment structures 58 of the reinforcing structure 36 are configured as weld nuts. The weld nuts may be integrally molded to include internal threads 79 for receiving a fastener 65, such as a threaded screw, for example, for attaching the additional vehicle component 59 to the BIW member 30 (see, e.g., FIG. 6).

Figure 7:
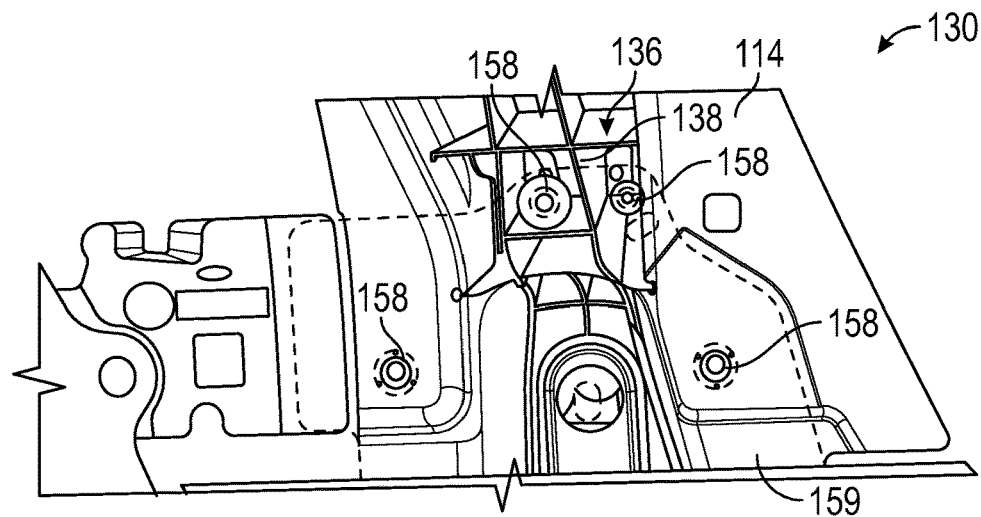
FIG. 7 illustrates another exemplary BIW member.

FIG. 7 illustrates another exemplary BIW member 130. The BIW member 130 may include a sheet metal panel 114 and a reinforcing structure 136 overmolded onto the sheet metal panel 114. The reinforcing structure 136 may include a plurality of integrally molded attachment structures 158. Each integrally molded attachment structure 158 establishes a structurally reinforced mounting location for mounting an additional vehicle component, in this case a metallic reinforcing plate 159, to the BIW member 130.

In an embodiment, the integrally molded attachment structures 158 are configured as weld nuts for receiving fasteners for attaching the metallic reinforcing plate 159 to the BIW member 130. However, other attachment structures are also contemplated. In another embodiment, the integrally molded attachment structures 158 are molded into an energy absorbing portion 138 of the reinforcing structure 136.

Figure 8:
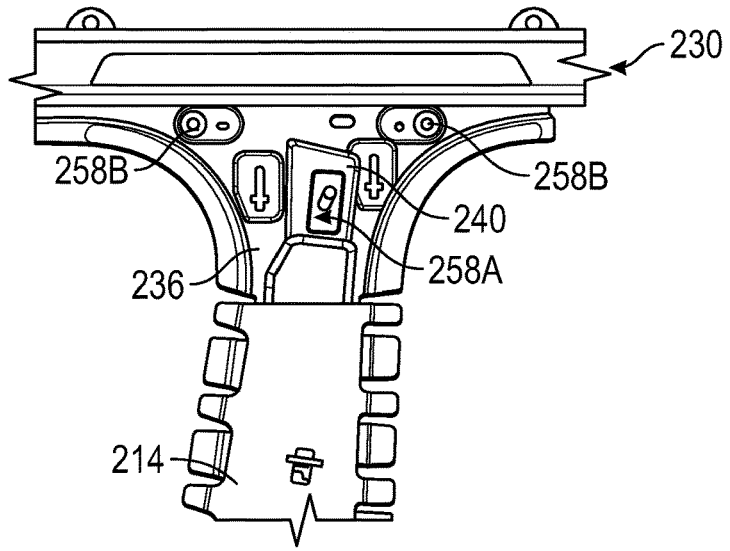
FIG. 8 illustrates another exemplary BIW member.

FIG. 8 illustrates another exemplary BIW member 230. The BIW member 230 may include a sheet metal panel 214 and a reinforcing structure 236 overmolded onto the sheet metal panel 214. The reinforcing structure 236 may include an integrally molded attachment structure 258A that establishes a structurally reinforced mounting location for mounting an additional vehicle component to the BIW member 130.

In an embodiment, the integrally molded attachment structure 258A is a bracket. The BIW member 230 may optionally include one or more additional integrally molded attachment structures 258B (e.g., nuts), which are configured differently from the integrally molded attachment structure 258A, that are configured to provide additional mounting locations. In another embodiment, the integrally molded attachment structure 258 is molded into a plastic rib structure 240 of the reinforcing structure 236.

Figures 9A, 9B:
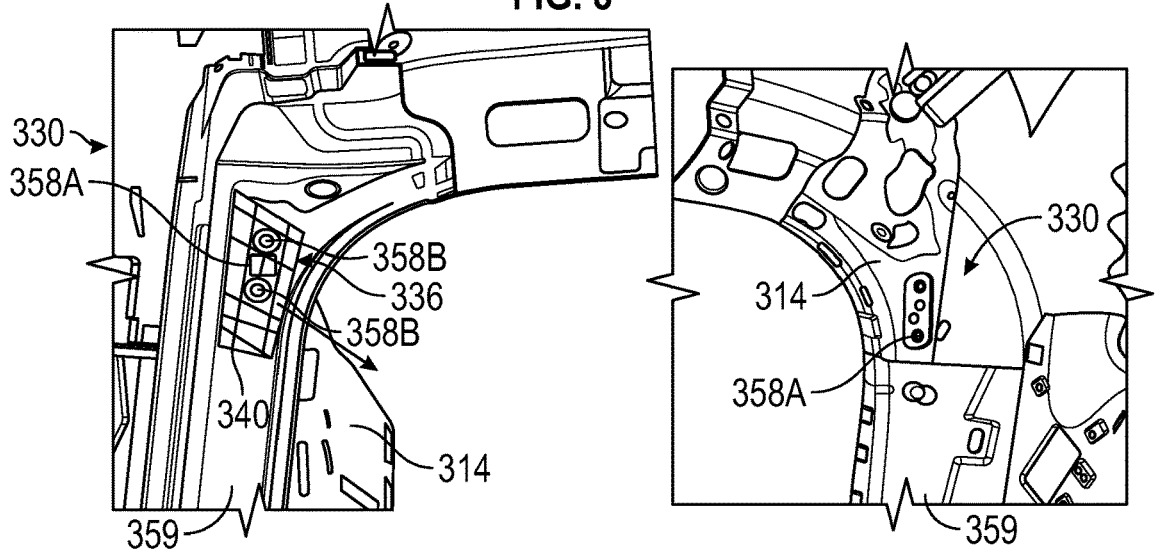
FIGS. 9A and 9B illustrate another exemplary BIW member.

FIGS. 9A and 9B illustrate another exemplary BIW member 330. FIG. 9A is an outboard view of the BIW member 330, and FIG. 9B is an inboard view of the BIW member 330.

The BIW member 330 may include a sheet metal panel 314 and a reinforcing structure 336 overmolded onto the sheet metal panel 314. The reinforcing structure 336 may include integrally molded attachment structures 358A, 358B that each establishes a structurally reinforced mounting location for mounting an additional vehicle component, such as a metallic trough 359, to the BIW member 330.

In an embodiment, the integrally molded attachment structure 358A is a bracket and the integrally molded attachment structures 358B are weld nuts. In another embodiment, the integrally molded attachment structure 358A, 358B are molded into a plastic rib structure 340 of the reinforcing structure 336.

Figure 10:
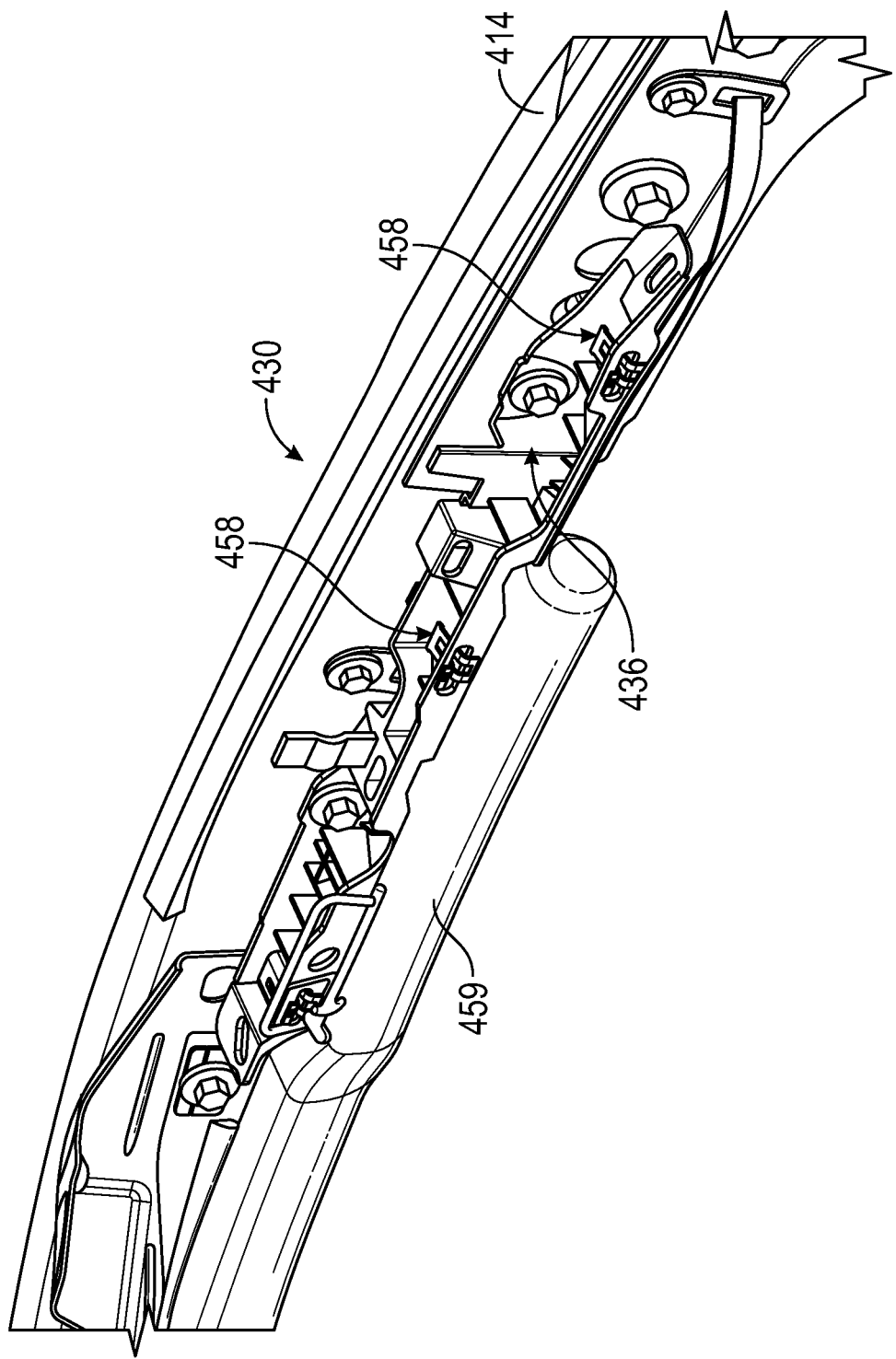
FIG. 10 illustrates yet another exemplary BIW member.

FIG. 10 illustrates yet another exemplary BIW member 430. The BIW member 430 may include a sheet metal panel 414 and a reinforcing structure 436 overmolded onto the sheet metal panel 414. The reinforcing structure 436 may include one or more integrally molded attachment structures 458. The integrally molded attachment structure 458 establishes a structurally reinforced mounting location for mounting an additional vehicle component, in this case a trim piece 459, to the BIW member 430.

In an embodiment, the integrally molded attachment structures 458 is a trim clip. However, other attachment structures are also contemplated.

Overmolding is the process of adding a second/additional layer of material over an already existing part. An example of this process/method for forming the BIW member 30 of FIGS. 2-6 is shown in FIGS. 11-16. A similar method as that described below could also be used to form any of the BIW members shown in FIGS. 7-10.

Figure 11:
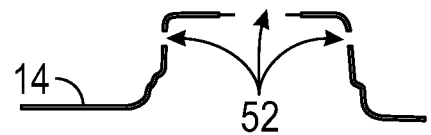
FIGS. 11, 12A, 12B, 13, 14, 15, and 16 schematically illustrate an exemplary method for forming a BIW member that includes an overmolded reinforcing structure having an integrally molded attachment structure.
Figure 12A:
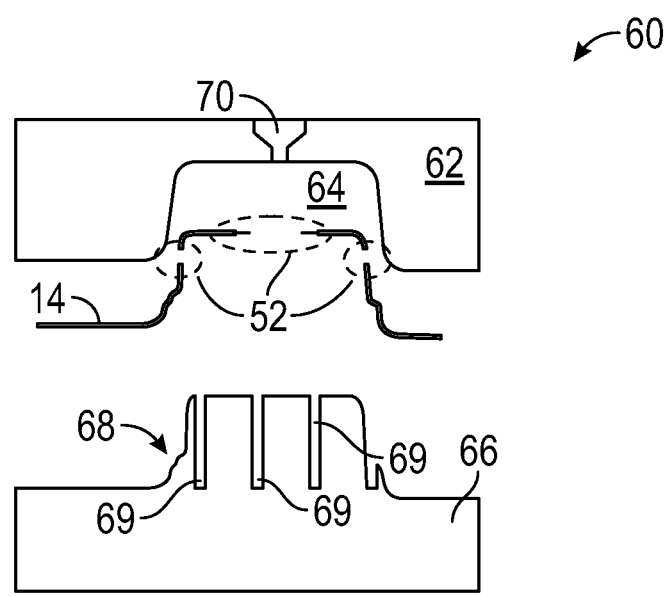
Figure 12B:
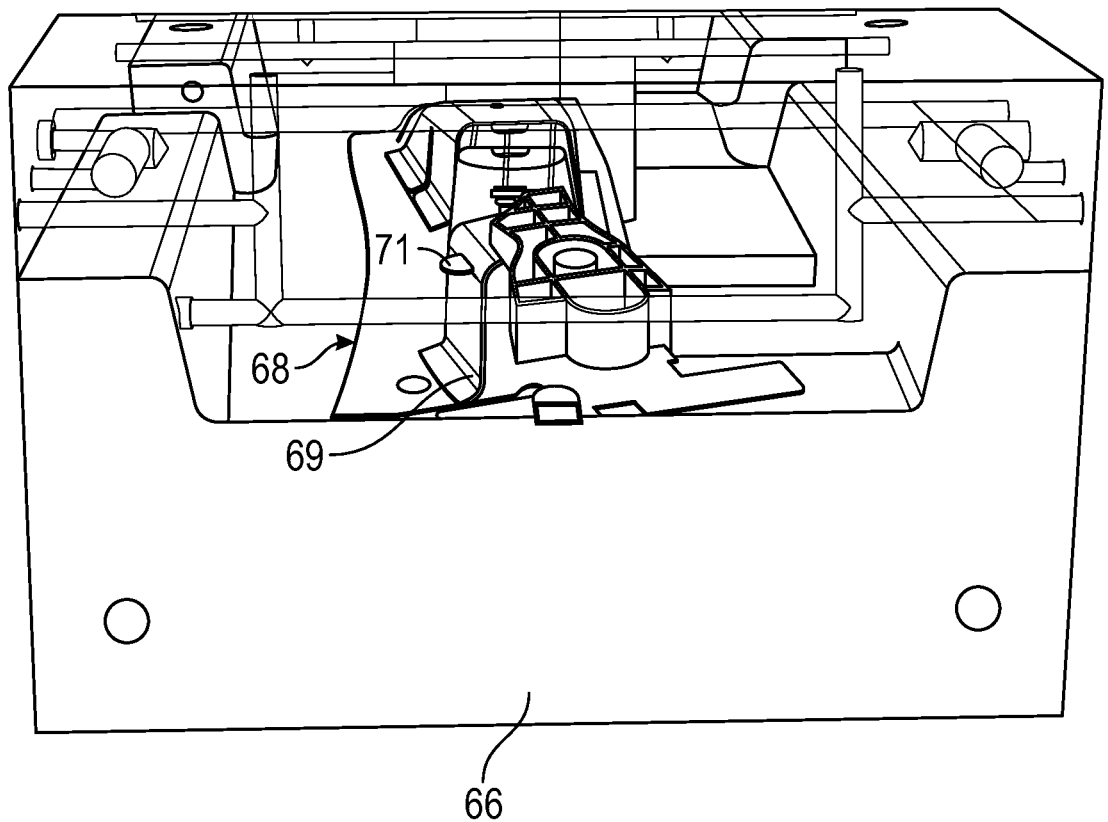
Figure 13:
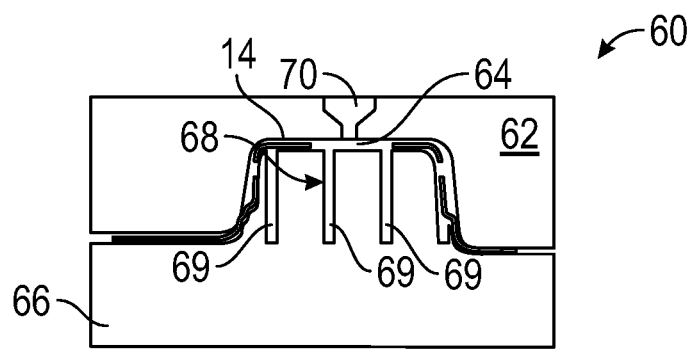

A stamped/molded sheet metal part, e.g., the outer panel 14 of the BIW member 30, is shown alone and prior to the overmolding process in FIG. 11. The outer panel 14 may be transferred and loaded into an injection molding die 60 as shown in FIG. 12A. The injection molding die 60 may include an upper portion 62 with a cavity 64 that receives the outer panel 14 and a core 66 that is shaped as indicated at 68 to define the rib structure 40 of the reinforcing structure 36. The core 66 may be positioned within the cavity 64 and the die 60 is then closed as shown in FIG. 13.

Figure 14:
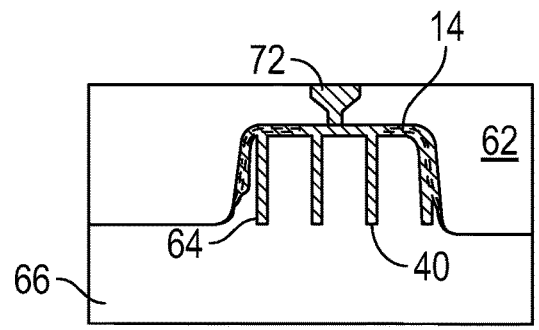

The upper portion 62 of the injection molding die includes an inlet 70 through which a composite or plastic material may be introduced into the cavity 64. In an embodiment, as shown in FIG. 14, a single shot of the material 72, e.g., a thermoplastic material, is introduced via the inlet 70 and then molded over the metal material of the outer panel 14 to create the final molded part 74.

The holes 52 on the outer panel 14 allow the molten plastic to flow on either side of the outer panel 14 to form the mechanical interlocks 50 with the sheet metal thereby making the structure as one piece. The shape 68 of the core 66 may include slots 69 for forming the rib structure 40. At least one of the slots 69 may include a formation 71 (see FIG. 12B) for forming the integrally molded attachment structure 58.

Figure 15:
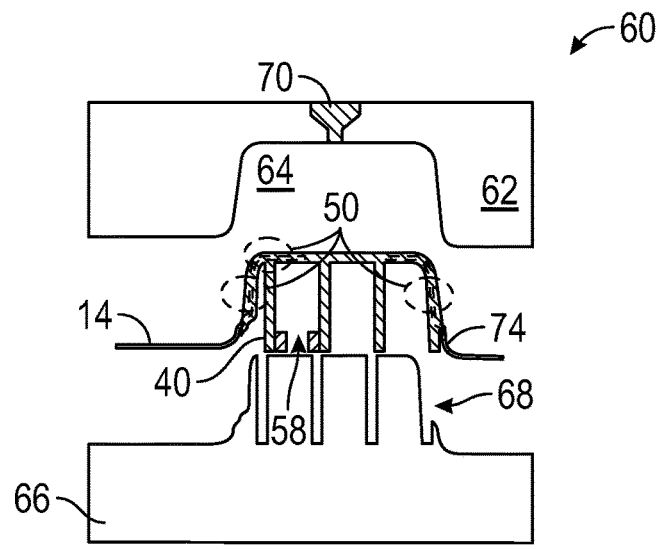
Figure 16:
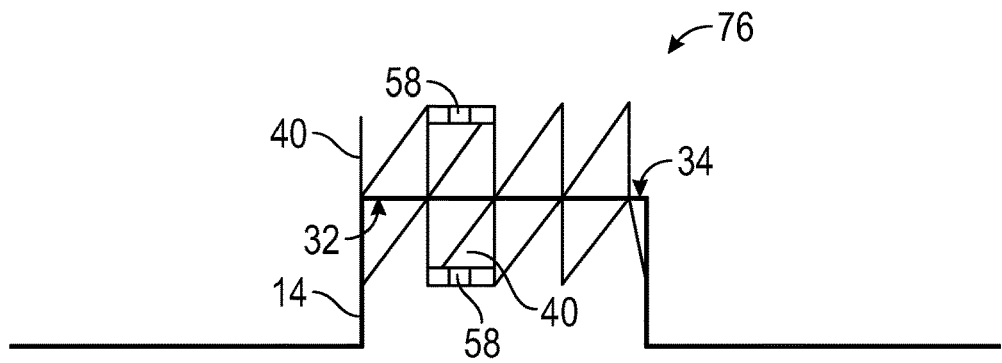

Next, the die 60 is opened and the final molded part 74 is then removed as shown in FIG. 15. The overmolding process ensures strong/tight mechanical bond/interlocks between the assembled inserts thus eliminating the use of adhesives or other joining processes (rivet, bolt, screw, etc.) to attain a higher buckling resistance and stiffness. FIG. 15 shows the final molded part 74 with the rib structure 40 on one side and including a single integrally molded attachment structure 58. FIG. 16 shows an example of a final molded part 76 with the rib structure 40 on both sides such as would be used with the disclosed outer panel 14 and including multiple integrally molded attachment structures 58.

The subject disclosure uses overmold technology to provide a BIW integrated panel/member where composite or plastic material that is molded onto a sheet metal panel is used to tailor the placement of reinforcing, energy absorbing, and attachment structures at locations where they are most effective. The rib structures (honeycomb cell/Rib/Bionic) of the reinforcing and energy absorbing structures serve as structural reinforcements and impact absorbers for impact events, and the attachment structures serve as structurally reinforced attachment locations for securing additional components to the BIW panel. This allows for part integration and achieves weight and cost reductions for the BIW structure as well as the possibility of eliminating tooling and assembly parts and joints.

The overmolding process that provides the rib and attachment structures for a metal panel can be used in a variety of BIW applications on vehicle areas that experience impact loads and that need to provide attachment surfaces for attaching other vehicle parts. Some example structures include floor/seat cross members, top bow, bumpers, A/B/C/D pillars, hinge pillar, rockers, door beams, etc.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle body component, comprising:
a sheet metal panel;
a reinforcing structure molded on the sheet metal panel; and
an integrally molded attachment structure formed within the reinforcing structure,
wherein the integrally molded attachment structure is an integrally molded weld nut formed in a rib structure of the reinforcing structure or an integrally molded bracket formed in the rib structure.

2. The vehicle body component as recited in claim 1, wherein the vehicle body component is a vehicle pillar.

3. The vehicle body component as recited in claim 1, wherein the reinforcing structure is comprised of a thermoplastic material.

4. The vehicle body component as recited in claim 1, wherein the reinforcing structure is molded on both an inboard side and an outboard side of the sheet metal panel.

5. The vehicle body component as recited in claim 4, wherein the rib structure of the reinforcing structure is molded on the inboard side and an energy absorbing portion of the reinforcing structure is molded on the outboard side.

6. The vehicle body component as recited in claim 1, wherein the weld nut includes an internal thread configured to receive a fastener.

7. The vehicle body component as recited in claim 1, comprising a vehicle component attached to the sheet metal panel via the integrally molded attachment structure.

8. The vehicle body component as recited in claim 7, comprising a fastener passed through the vehicle component and into an internal thread of the integrally molded attachment structure.

9. The vehicle body component as recited in claim 1, wherein the integrally molded attachment structure includes the bracket and the weld nut.

10. The vehicle body component as recited in claim 1, wherein the reinforcing structure includes a rib structure that includes one or more of straight ribs, honeycombs, cellular ribs, or combinations thereof.

11. A method, comprising:
overmolding a sheet metal panel with a reinforcing structure to form a vehicle body-in-white member,
wherein the reinforcing structure includes a rib structure and an integrally molded attachment structure formed in the rib structure,
wherein the integrally molded attachment structure is an integrally molded weld nut or an integrally molded bracket formed in the rib structure.

12. The method as recited in claim 11, wherein overmolding the sheet metal panel with the reinforcing structure includes:
forming the rib structure of the reinforcing structure on a first side of the sheet metal panel; and
forming an energy absorbing structure of the reinforcing structure on a second side of the sheet metal panel.

13. The method as recited in claim 12, wherein the first side is an inboard side and the second side is an outboard side.

14. The method as recited in claim 11, wherein the method is a single-shot injection molding process.

15. The method as recited in claim 11, wherein the rib structure includes one or more of straight ribs, honeycombs, cellular ribs, or combinations thereof.

16. The method as recited in claim 11, wherein the vehicle body-in-white member is part of a vehicle pillar.

17. The method as recited in claim 11, comprising:
mounting a reinforcing plate, a trough, or a trim piece to the vehicle body-in-white member using the weld nut, the bracket, or both; and
disposing a second sheet metal panel over portions of the rib structure on an inboard side of the sheet metal panel.

18. The vehicle body component as recited in claim 1, comprising a second sheet metal panel disposed over portions of the rib structure on an inboard side of the sheet metal panel.

19. The vehicle body component as recited in claim 5, wherein the energy absorbing portion is configured to transfer an impact load toward a center of the sheet metal panel.

20. A vehicle body component, comprising:
a first sheet metal panel;
a reinforcing structure molded on the first sheet metal panel;
an integrally molded weld nut formed within a rib structure of the reinforcing structure,
wherein the integrally molded weld nut includes an internal thread;
a second sheet metal panel disposed over portions of the rib structure on an inboard side of the first sheet metal panel;
a vehicle component attached to the first sheet metal panel via the integrally molded weld nut,
wherein the vehicle component is reinforcing plate, a trough, or a trim piece; and
a fastener passed through the vehicle component and into the internal thread of the integrally molded weld nut, wherein, the first sheet metal panel, the reinforcing structure, the second sheet metal panel, and the vehicle component establish a vehicle pillar.

\* \* \* \* \*